United States Patent
Wakimoto

(10) Patent No.: US 6,862,675 B1
(45) Date of Patent: Mar. 1, 2005

(54) MICROPROCESSOR AND DEVICE INCLUDING MEMORY UNITS WITH DIFFERENT PHYSICAL ADDRESSES

(75) Inventor: Yasuhiro Wakimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 163 days.

(21) Appl. No.: 09/652,023

(22) Filed: Aug. 31, 2000

(30) Foreign Application Priority Data

Nov. 4, 1999 (JP) .......................................... 11-313323

(51) Int. Cl.⁷ ............................................. G06F 12/00
(52) U.S. Cl. ........................... 711/202; 711/3; 711/123; 711/125
(58) Field of Search .......................... 711/3.5, 118–129, 711/202

(56) References Cited

U.S. PATENT DOCUMENTS

| | | | |
|---|---|---|---|
| 5,586,283 A | * 12/1996 | Lopez-Aguado et al. ... | 711/207 |
| 5,802,554 A | 9/1998 | Caceres et al. | |
| 5,845,311 A | 12/1998 | Piguet et al. | |
| 6,173,381 B1 | * 1/2001 | Dye ........................... | 345/555 |
| 2001/0003199 A1 | * 6/2001 | Maruyama et al. ......... | 711/165 |

OTHER PUBLICATIONS

"The 68040 On–Chip Memory Subsystem", Robin Edenfield et al, *Computer Society International Conference, Spring Meeting*, Feb. 26,–Mar. 2, 1990, Vol. Conf. 35, pp. 264–269.

"The DSP32C: AT&T's Second Generation Floating–Point Digital Signal Processor", Michael Fuccio et al, *IEEE Micro*, Dec. 1, 1988, vol. 8, No. 6, pp. 30–47.

Edenfield, Robin, et al, "The 68040 On–Chip Memory Subsystem", Computer Society International Conference, IEEE Comp. Soc. Press, Vol Conf. 35, Feb. 1990, p. 264.

Fuccio, Michael L., "THe DSP32C: AT&T's Second–Generation Floating–Point Digital Signal Processor", IEEE Micro, vol. 8, No. 6, Dec. 1998, 1st page, unknown page number.

* cited by examiner

*Primary Examiner*—Matthew Kim
*Assistant Examiner*—Woo H. Choi
(74) *Attorney, Agent, or Firm*—Arent Fox, PLLC.

(57) ABSTRACT

A main memory and a higher-speed local memory are externally connected to a microprocessor. The entire load module is developed in the main memory. A part or all of the instruction codes in the load module developed in the main memory are stored in the local memory. A memory management unit for data converts a logical address of the entire load module into a physical address of the main memory. A memory management unit for instructions converts a logical address of the instruction code stored in the local memory into a physical address of the local memory. A CPU core gains the instruction code from the local memory at the time of execution of the instruction.

35 Claims, 5 Drawing Sheets

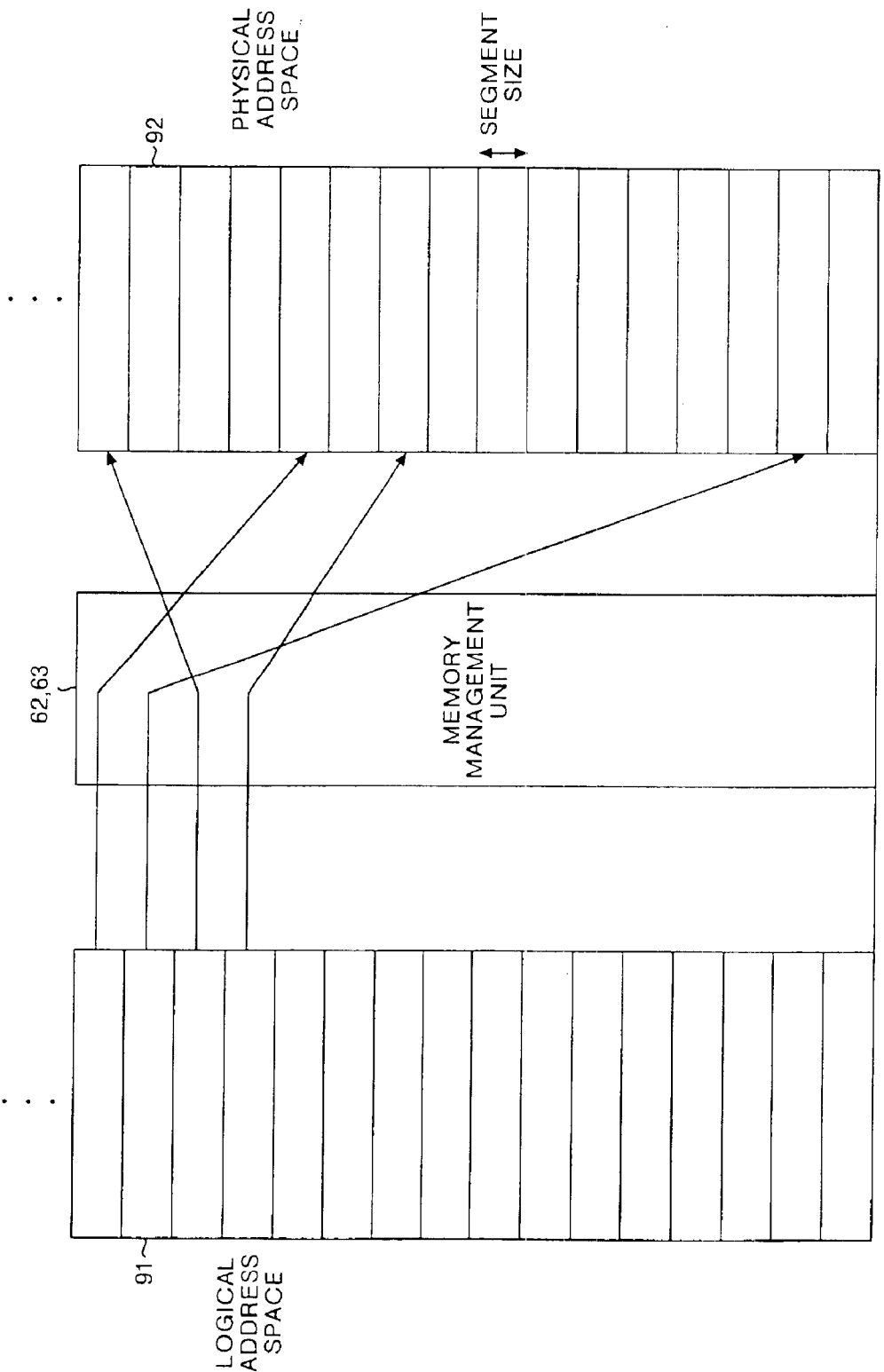

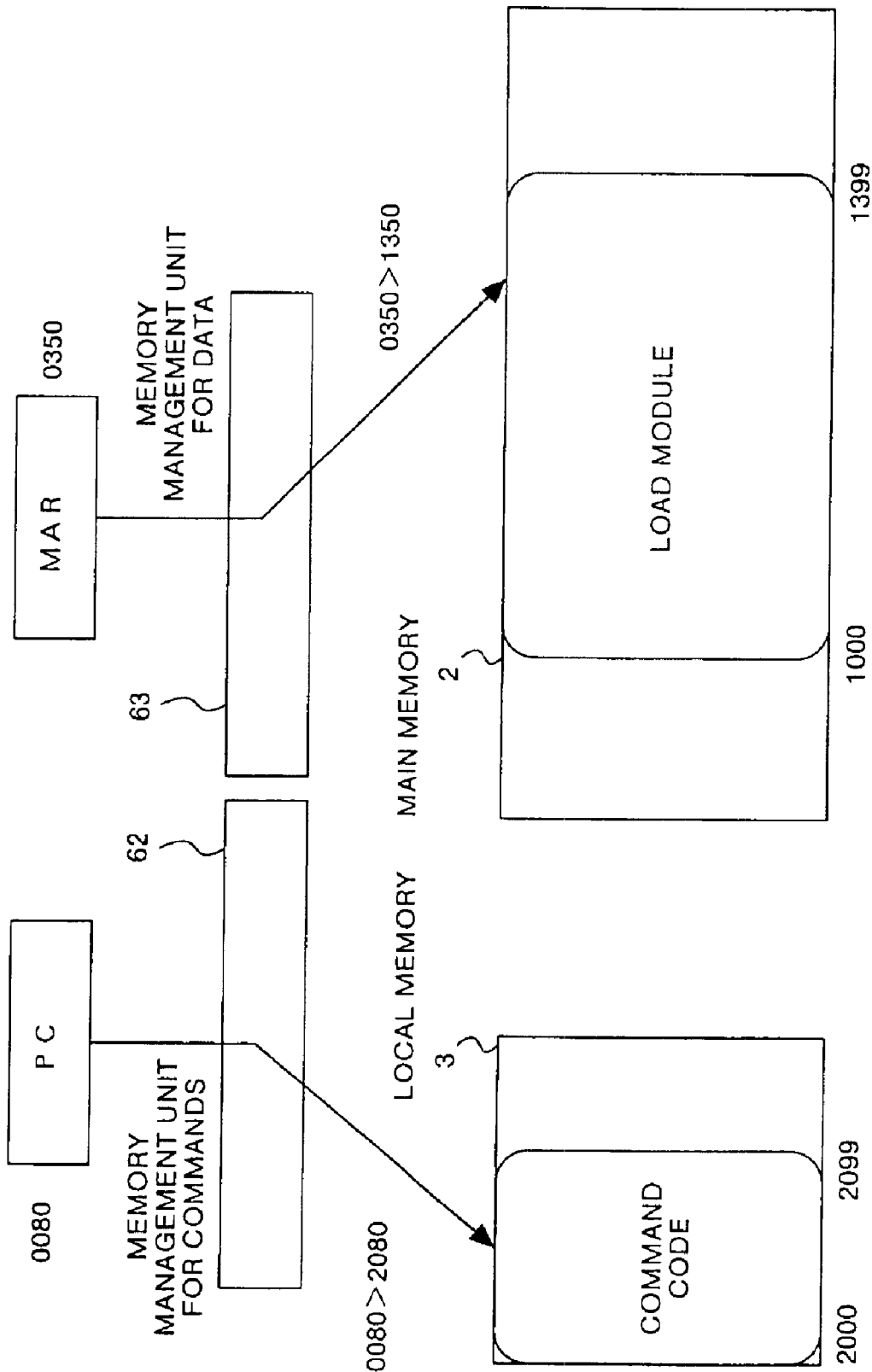

MICROPROCESSOR AND DEVICE INCLUDING MEMORY UNITS WITH DIFFERENT PHYSICAL ADDRESSES

FIELD OF THE INVENTION

The present invention relates to a microprocessor and a memory device for use in a computer or peripheral equipment of a computer.

BACKGROUND OF THE INVENTION

A microprocessor is generally incorporated in devices that perform image processing requiring high performance. The examples of such devices are laser beam printers or image recognizing apparatuses. Instruction codes and data such as constants or initial values required for the image processing are stored in a main memory provided outside of the microprocessor. This microprocessor also includes therein a cache memory. The microprocessor performs the processing by using basically the instruction codes and the data stored in the main memory or the cache memory.

In order to distinguish data in the narrow sense signifying numerical data such as constants or initial values (including characters) from data in the broad sense including instruction codes in addition of the data in the narrow sense, in this specification the data in the broad sense is simply referred to as "data" while the data in the narrow sense is referred to as "numerical data."

In general, the cache memory constitutes a logical memory hierarchy with the main memory. The main memory is constituted of a typical DRAM (a dynamic RAM) or the like. The cache memory is constituted of an SRAM (a static RAM) or the like which can be faster accessed as compared to the main memory.

The accessed instruction code or numerical data is stored in the cache memory together with instruction codes or numerical data therearound. If an access is made to the instruction code or numerical data stored in the cache memory, the instruction code or numerical data is read from not the main memory but the cache memory. Consequently, since the frequency of accesses to the slow main memory is reduced, the processing speed increases.

A physical address in the main memory and a physical address in the cache memory are assigned to the instruction code or numerical data stored in the cache memory. Naturally, both the physical addresses are different from each other. If the instruction code or numerical data to be accessed is not present in the cache memory when the memory is accessed, then the physical address of the main memory is designated. By contrast, if the instruction code or numerical data to be accessed is present in the cache memory, the physical address of the cache memory is designated.

Such address conversion is automatically performed by address conversion means called a tag register and a cache control unit incorporated in a processor. Therefore, a programmer need not pay any attention to the presence of the cache memory. Similarly, the microprocessor incorporates therein memory management units (MMUs) so as to control the access in the main memory.

These address conversion means set one physical address within a certain logical address range. Simultaneously with this, the address conversion means define common access attributes and the like within the set range. A load module includes the instruction code or the numerical data for use in executing the instruction code which has a different type of access. However, the address conversion means in a part of a cache control unit and the memory management unit handles the instruction code and the numerical data in the same manner without any distinction.

However, in a memory access mechanism by the use of the above-described cache memory, if the data to be processed becomes vast, for example, as in the case of image processing, the cache memory is frequently rewritten. Consequently, the local instruction code or numerical data, for which the cache memory in itself should function effectively, may be swapped out of the cache memory. Therefore, the hit rate of the cache memory is decreased, so that the effect of high-speed processing cannot be sufficiently produced. Further, if the capacity of the main memory is increased so as to incorporate large amount of data then its access speed decreases.

Use of high-speed and large-capacity cache memory can prevent the cache memory from being frequently rewritten even in the case where the large scale data is processed. However, such a high-speed and large-capacity memory is expensive. In contrast, use of an inexpensive memory of a large capacity may sacrifice an access time.

SUMMARY OF THE INVENTION

It is the object of this invention to provide a microprocessor and a memory device, in which instructions or data of high locality can be efficiently accessed even if a large data having low locality is processed, for example, as in the case of image processing.

In order to achieve the above-described object, the present invention is featured by the following configuration. A first memory unit (a main memory) and a second memory unit (a local memory) are externally connected to the microprocessor. The entire load module is developed in the first memory unit (the main memory). Here, the load module includes instruction codes, data (numerical data) such as constants or initial values and working region dedication.

In the second memory unit are stored a part or all of the instruction codes in the load module developed in the first memory unit (the main memory) by copying or writing them. Size of the instruction code stored in the second memory unit (the local memory) is set to be equal to or smaller than the capacity of the second memory unit (the local memory)

Further, a first address conversion unit (a memory management unit for data) and a second address conversion unit (a memory management unit for instructions) are provided. The first address conversion unit (the memory management unit for the data) converts a logical address of the entire load module into a physical address of the first memory unit (the main memory). The second address conversion unit (the memory management unit for the instructions) converts a logical address of the instruction code in the load module into a physical address of the second memory unit (the local memory)

The first memory unit (the main memory) is constituted of a memory of a large capacity such as a DIMM (a dual inline memory module). The second memory unit (the local memory) is a memory which is smaller in capacity than the first memory unit (the main memory) but is operated at a higher speed, such as a single high-speed synchronous DRAM.

Thus, according to the present invention, when the microprocessor executes an instruction, it gains the instruction code from the high-speed second memory unit (the local memory) Then, the microprocessor executes the instruction. The instruction code is generally high in locality. Therefore, even if the second memory unit (the local memory) is a memory of a small capacity, the effect of a higher speed can be sufficiently produced.

By contrast, the large-scale data used in image processing or the like is generally low in locality. Therefore, even if such data is allocated and transferred to the small-capacity second memory unit (the local memory), the effect of a higher speed cannot be sufficiently produced due to a loss caused by frequent transferring. Thus, the entire load module is stored in the large capacity first memory unit (the main memory).

There are some working data, such as a stack, being high in locality. Such working data being high in locality may be stored in the second memory unit (the local memory). In this case, the second address converting unit (the memory management unit for the instructions) converts a logical address of the working data such as a stack into a physical address of the second memory unit (the local memory).

Other objects and features of this invention will become apparent from the following description with reference to the accompanying drawings.

BRIEF DESCRIPTION OF THE DRAWINGS

FIG. 4 is a schematic diagram showing the manner in which a logical address space is mapped to a physical address space by the effect of address conversion by the memory management units shown in FIG. 3.

FIG. 5 is a schematic diagram showing the respective mapping results of the entire load module and instruction codes.

DESCRIPTION OF THE PREFERRED EMBODIMENTS

A preferred embodiment of the present invention will be explained in detail below with reference to the drawings.

Figure 1:
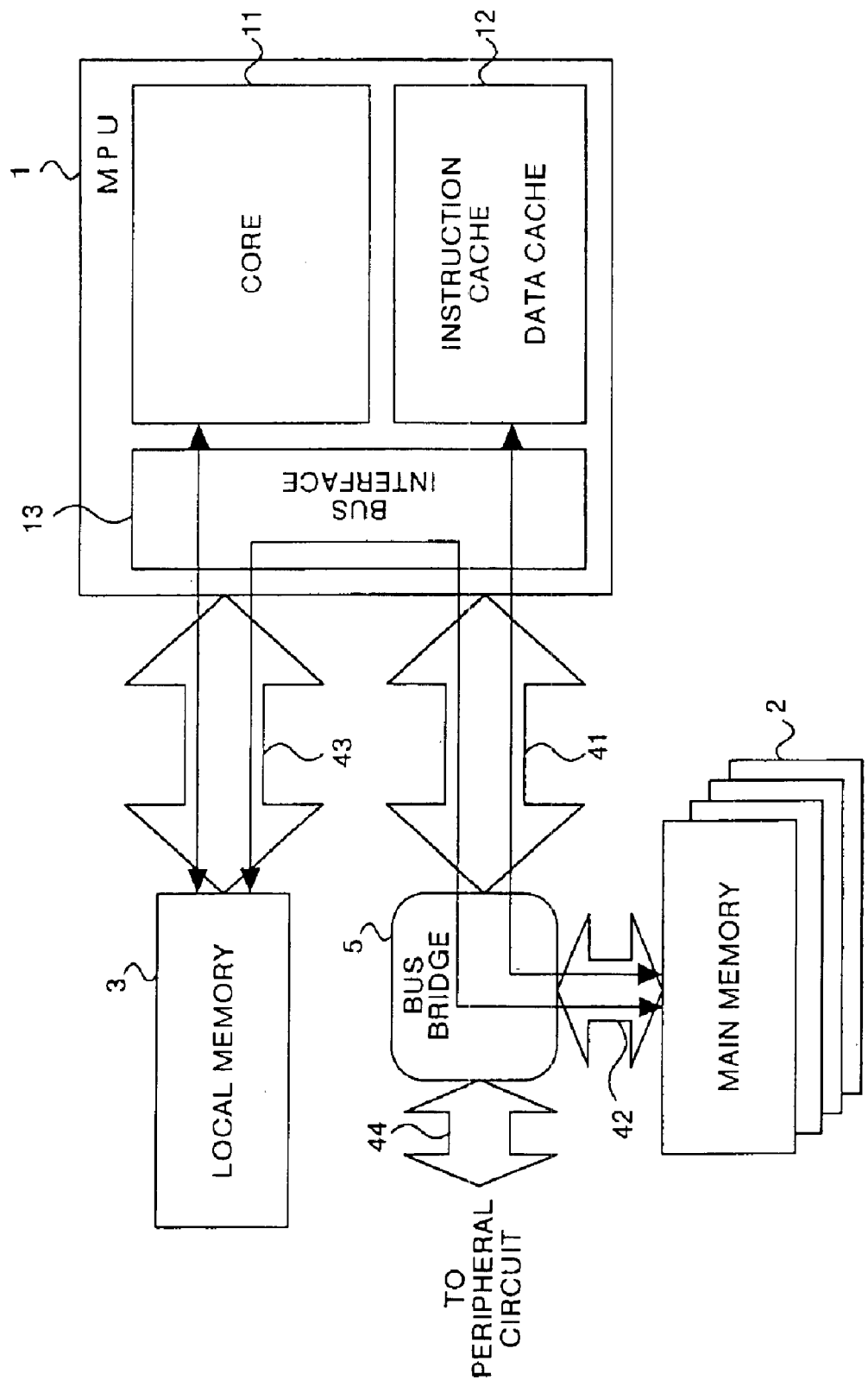
FIG. 1 is a block diagram showing one example of a memory according to the present invention.

FIG. 1 is a block diagram showing one example of a memory according to the present invention. This memory comprises a microprocessor (MPU) 1, a main memory 2 serving as the first memory unit and a local memory 3 serving as the second memory unit.

The microprocessor 1 is connected to the main memory 2 via an external bus 41, a bus bridge 5 and an another external bus 42. Moreover, the microprocessor 1 is connected to the local memory 3 via an external bus 43.

The main memory 2 is constituted of an ordinary DRAM such as a DIMM of a large capacity. The local memory 3 is constituted of a synchronous DRAM (an SDRAM) which is smaller in capacity than the main memory 2 but can be operated at high speed.

Furthermore, the microprocessor 1 is connected to a peripheral circuit, not shown, via the external bus 41, the bus bridge 5 and an external bus 44. The microprocessor 1 includes a core 11 which performs arithmetic calculations, a cache memory 12 which stores therein instruction codes or data, and a bus interface 13 connected to the external buses 41 and 43.

Addresses or data are bidirectionally transferred between the microprocessor 1 and the main memory 2 via the external buses 41, 42 and the bus bridge 5. Addresses or instruction codes are bidirectionally transferred between the microprocessor 1 and the local memory 3 via the external bus 43. Data is bidirectionally and directly transferred between the main memory 2 and the local memory 3 via the external buses 41 and 43 by way of the bus interface 13.

Figure 2:
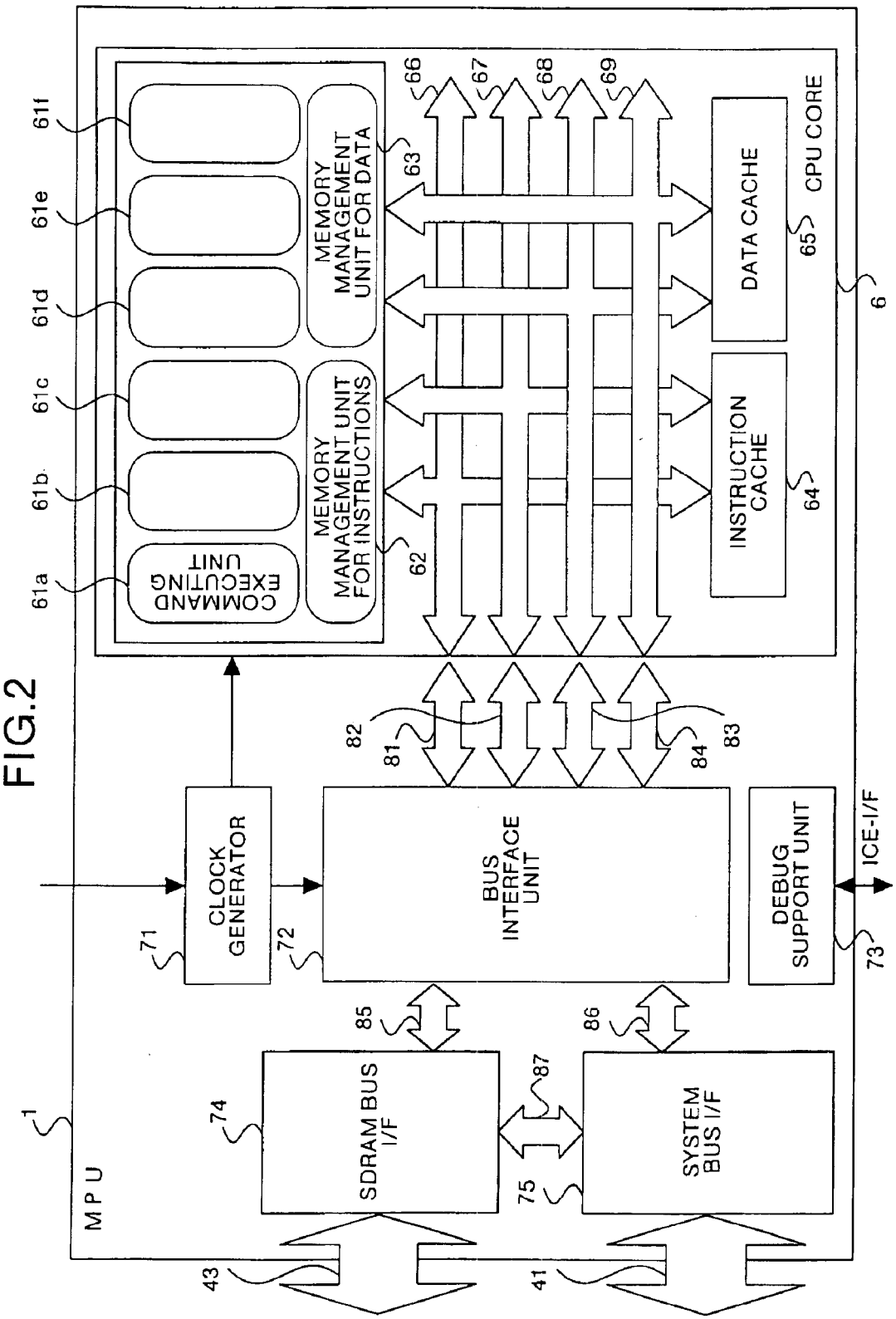
FIG. 2 is a block diagram showing one example of the detailed configuration of a microprocessor according to the present invention.

FIG. 2 is a block diagram showing one example of the detailed configuration of the microprocessor 1.

The microprocessor 1 comprises a central processing unit (CPU) core 6, a clock generator 71, a bus interface unit 72, a debug support unit 73, an SDRAM bus interface 74, and a system bus interface 75.

The CPU core 6 includes, for example, six instruction executing units 61a, 61b, 61c, 61d, 61e and 61f, a memory management unit 62 for instructions serving as the second address conversion unit and a memory management unit 63 for data serving as the first address conversion unit.

The CPU core 6 develops the entire load module in the main memory 2 (see FIG. 1). And then, the CPU core 6 copies, to the local memory 3, a part or all of the instruction codes in the load module developed in the main memory 2. Consequently, the CPU core 6 is equipped with the function as the copying unit. Size of the instruction code to be copied to the local memory 3 is set to be equal to or smaller than a capacity of the local memory 3.

The memory management unit 63 for the data assigns a physical address of the main memory 2 to a logical address of the entire load module developed in the main memory 2. The memory management unit 62 for the instructions assigns a physical address of the local memory 3 to a logical address of the instruction code copied to the local memory 3.

Furthermore, the CPU core 6 includes an instruction cache 64 and a data cache 65 constituting the cache memory 12 shown in FIG. 1. The memory management unit 62 for the instructions or the memory management unit 63 for the data and the instruction cache 64 or the data cache 65 are connected to each other via a data bus 66 for the instruction codes, an address bus 67 for the instruction codes, an address bus 68 for the data and a data bus 69 for the data.

The CPU core 6 is connected to the SDRAM bus interface 74 or the system bus interface 75 via internal buses 81, 82, 83 and 84, the bus interface unit 72 and internal buses 85 and 86. The external bus 43 to which the local memory is connected, is connected to the SDRAM bus interface 74. The external bus 41 to which the main memory is connected, is connected to the system bus interface 75. The SDRAM bus interface 74 and the system bus interface 75 are connected to each other via an internal bus 87.

The bus interface unit 72 compares a previously set physical address range with an access request from the CPU core 6. As a result, the system bus interface 75 is actuated when the access request from the CPU core 6 corresponds to the physical address of the main memory 2.

On the other hand, the SDRAM bus interface 74 is actuated when the access request from the CPU core 6 corresponds to the physical address of the local memory 3. Consequently, a region corresponding to the external bus 43 connected to the local memory 3 and a region corresponding to the external bus 41 connected to the main memory 2 are assigned to arbitrary physical addresses.

The clock generator 71 generates an internal clock based on an external clock, and then, supplies the generated clock to the CPU core 6 and the bus interface unit 72. The debug support unit 73 is connected to a not shown ICE (an in-circuit emulator) via an interface.

Figure 3:
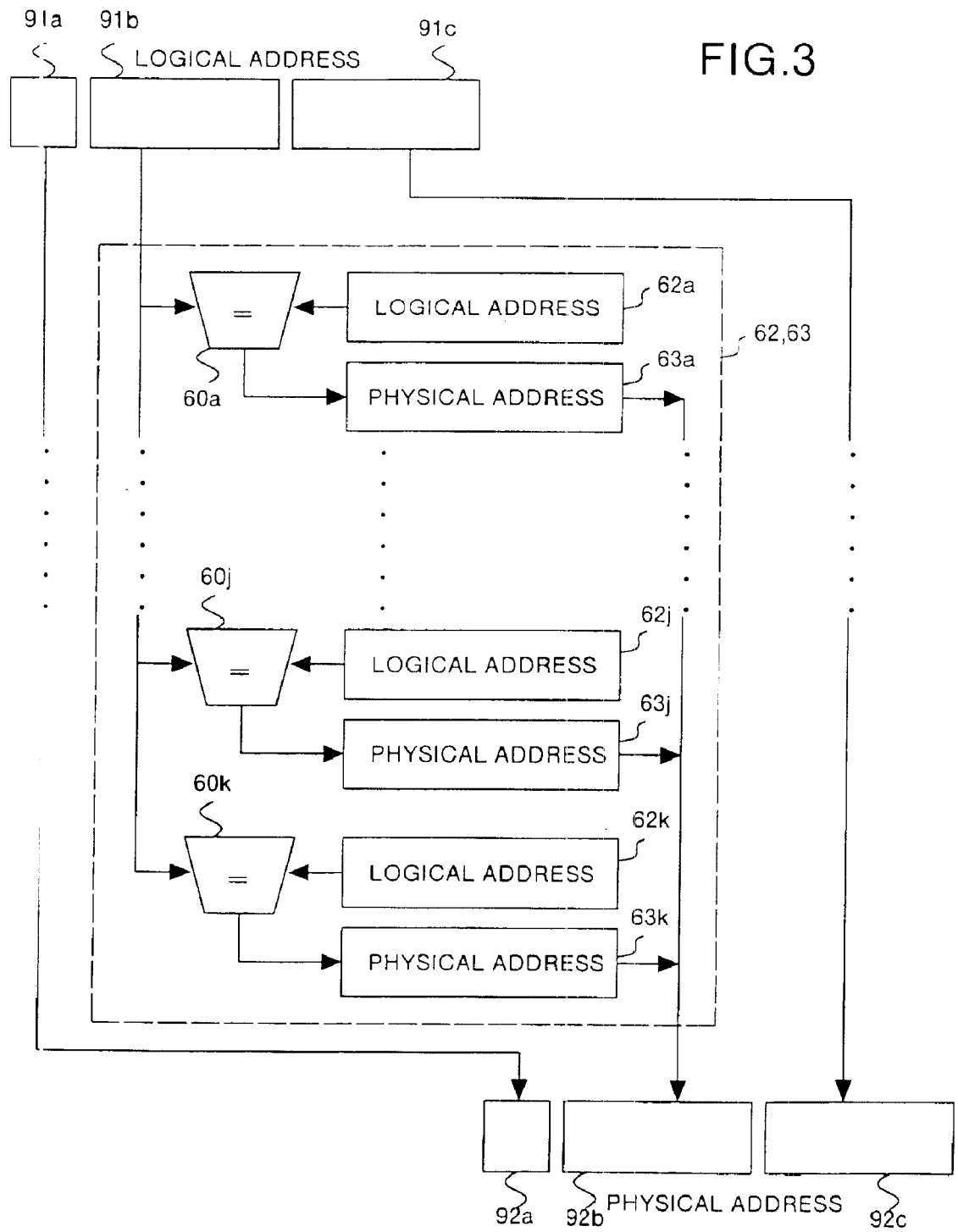
FIG. 3 is a schematic diagram showing the configurations of memory management units incorporated in the microprocessor shown in FIG. 2.

FIG. 3 is a schematic diagram showing the configurations of the memory management units 62 and 63.

The memory management units 62 and 63 include a plurality of logical address regions 62*a*, . . . , 62*j* and 62*k* for storing logical addresses therein, a plurality of physical address regions 63*a*, . . . , 63*j* and 63*k* for storing physical addresses therein and a plurality of comparators 60*a*, . . . , 60*j* and 60*k*.

In case of the memory management unit 63 for the data, logical addresses relating to the load module developed in the main memory 2 are stored in the logical address regions 62*a*, 62*j* and 62*k*. On the other hand, in case of the memory management unit 62 for the instructions, logical addresses relating to the instruction codes stored in the local memory 3 are stored in the logical address regions 62*a*, . . . , 62*j* and 62*k*. Physical addresses assigned to the logical addresses stored in the respective logical address regions 62*a*, . . . , 62*j* and 62*k* are stored in the physical address regions 63*a*, . . . , 63*j* and 63*k*.

The comparators 60*a*, . . . , 60*j* and 60*k* compare a logical address 91*b* with an access request from the CPU core 6 with each of the logical addresses stored in the logical address regions 62*a*, . . . , 62*j* and 62*k*.

Here, the memory management units 62 and 63 may include a mechanism for selecting the relationship between the logical address and the physical address from a plurality of different settings based on the instruction being executed, and therefore, may set two or more kinds of different physical addresses with respect to the same logical address.

This is effective in the case where, for example, the content of a certain instruction code is an instruction to refer to its own address, i.e., an address in the main memory 2 of the instruction code (for example, an instruction of a word effect address). In other words, the CPU core 6 reads the instruction code from the local memory 3, and then executes it. The CPU core 6 can gain an absolute address in reference to the main memory 2.

Moreover, the memory management units 62 and 63 may include a mechanism capable of selecting a plurality of different relationships between the logical addresses and the physical addresses based on information on a process number or the like stored at the time of accessing, and therefore, may set two or more kinds of different physical addresses with respect to the same logical address.

This is effective in the case where a plurality of tasks are performed in parallel in the case of, for example, a so-called multi-task. In other words, the CPU core 6 reads the instruction code from the local memory 3 with respect to a task of a high priority. In case of the instruction code relating to a task of a low priority, the CPU core 6 can read the instruction code from the main memory 2.

Furthermore, the memory management units 62 and 63 may include a mechanism capable of selecting the different relationships between the logical addresses and the physical addresses depending on an accessing timing, and therefore, may set two or more kinds of different physical addresses with respect to the same logical address.

This is effective in executing an instruction code in which a priority is high within a predetermined period while the priority becomes lower after a lapse of the time. In other words, when the CPU core 6 executes a certain instruction code, the CPU core 6 can read the instruction code from the local memory 3 during the high priority. On the other hand, can read the instruction code from the main memory 2 as the priority becomes lower.

Subsequently, operation of the microprocessor will be explained. In the beginning, when the module is loaded, the entire load module is developed in the main memory 2 by the CPU core 6. Furthermore, the instruction codes in the load module are copied to the local memory 3 in a size equal to or smaller than the capacity of the local memory 3.

In case of the memory management unit 63 for the data, the logical addresses of the entire load module developed in the main memory 2 are stored in the logical address regions 62*a*, . . . , 62*j* and 62*k*. Further, the physical addresses corresponding to the logical addresses stored in the logical address regions 62*a*, . . . , 62*j* and 62*k* are stored in the physical address storing regions 63*a*, . . . , 63*j* and 63*k*.

In the same manner, in case of the memory management unit 62 for the instructions, the logical addresses of the instruction codes stored in the local memory 3 are stored in the logical address regions 62*a*, . . . , 62*j* and 62*k*. Furthermore, the physical addresses corresponding to the logical addresses stored in the logical address regions 62*a*, . . . , 62*j* and 62*k* are stored in the physical address storing regions 63*a*, . . . , 63*j* and 63*k*.

Upon an access request from the CPU core 6, the logical address requested by the CPU core 6 is compared with each of the logical addresses stored in the logical address regions 62*a*, . . . , 62*j* and 62*k* by the respective comparators 60*a*, . . . , 60*j* and 60*k* in the memory management unit 63 for the data and the memory management unit 62 for the instructions. These comparisons are simultaneously carried out in the comparators 60*a*, . . . , 60*j* and 60*k*.

If the logical address requested by the CPU core 6 matches with any one out of the logical addresses stored in the logical address regions 62*a*, . . . , 62*j* and 62*k*, the memory management units 62 and 63 output a physical address corresponding to a physical address 92*b* in accordance with the logical address 91*b*. If the logical address requested by the CPU core 6 does not match with any logical address stored in the logical address regions 62*a*, . . . , 62*j* and 62*k*, the memory management units 62 and 63 output logical addresses 91*a* and 91*c* as physical addresses 92*a* and 92*c* as they are.

The above-described address conversion represents mapping of a logical address space 91 to a physical address space 92 in a segment unit. FIG. 4 schematically shows the mapping manner.

FIG. 5 is a schematic diagram showing mapping manners different between the entire load module and the instruction codes included in the load module. The entire load module including the instruction codes, the numerical data and the working regions is developed in the main memory 2. For example, in the illustrated example, a logical address "0350" of a memory address register (an MAR) is mapped to a physical address "1000 to 1399" corresponding to the main memory 2.

By contrast, the instruction code in the load module is developed in the local memory 3. For example, in the illustrated example, a logical address "0080" of a program counter (a PC) is mapped to a physical address "2000 to 2099" corresponding to the local memory 3.

In the case where the CPU core 6 is to execute the instruction in excess of the size of the instruction code stored in the local memory 3, the memory management unit 62 for the instructions detects an address conversion error by the effect of a page error hit function. Therefore, the instruction codes within an appropriate range including the instruction code requested at that timing are transferred from the main memory 2 to the local memory 3.

The memory management unit 62 for the instructions updates the addresses stored in the logical address regions 62a, . . . , 62j and 62k to logical addresses for the newly transferred instructions codes. In accordance with this, the physical addresses in the physical address regions 63a, 63j and 63k also are updated. In this manner, the instruction codes stored in the local memory 3 are updated, so that the CPU core 6 keeps executing the instructions. Incidentally, even if a new instruction code is transferred during the execution of the instruction, a loss can be suppressed to a low level since the locality of the instruction code is high.

According to the present invention, the entire load module is developed in the large capacity main memory 2 connected externally to the microprocessor 1. A part or all of the instruction codes in the load module developed in the main memory 2 are stored in the high-speed local memory 3 connected externally to the microprocessor 1. Consequently, even in the case where large scale non-local data for use in the image processing or the like is loaded, the instruction code inside the high-speed local memory 3 can be executed at a high speed.

Furthermore, the provision of the local memory 3 can reduce the accesses to the main memory, thereby saving power consumption. Moreover, an inexpensive low-speed memory can be used the main memory 2, so that an increase in cost can be suppressed in spite of the enhancement of processing performance.

Although it is mentioned above that the instruction codes are stored in the local memory 3, the present invention is not limited to this. Any data such as numerical data may be stored in the local memory 3 as long as the data is high in locality.

Furthermore, although it is mentioned above that the instruction codes in the load module developed in the main memory 2 are copied to the local memory 3, the present invention is not limited to this. The load module is developed in the main memory 2, and further, the instruction codes may be stored in the local memory 3.

Thus, according to the present invention the entire load module is developed in the first memory unit of a large capacity. A part or all of the instruction codes in the load module are stored in the second memory unit of a high speed. Thus, even in the case where the load module including the non-local data of a large scale for use in the image processing or the like is loaded, the instruction code inside the second memory unit can be executed, thus enhancing the processing performance of the entire system.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A microprocessor to which a plurality of memory units including a first memory unit and a second memory unit and having physical addresses different from each other are externally connected, said microprocessor comprising:
a first address conversion unit which carries out a first address conversion by assigning a first physical address of said first memory unit to a first logical address of a load module stored in said first memory unit, wherein said load module includes an instruction code and numerical data;
a copying unit which copies said instruction code from said load module stored in said first memory unit to said second memory unit; and
a second address conversion unit which carries out a second address conversion different from the first address conversion by assigning a second physical address of said second memory unit to a second logical address of the instruction code copied to said second memory unit, wherein
said first address conversion unit comprises a first comparator that compares a requested logical address with said first logical address, and
said second address conversion unit comprises a second comparator that compares said requested logical address with said second logical address.

2. The microprocessor according to claim 1, wherein when said load module stored in said second memory unit is accessed, said first address conversion unit assigns the physical address of said first memory unit to the logical address of said load module to be accessed, and said second address conversion unit assigns the physical address of said second memory unit to said logical address of the instruction code from said load module to be accessed.

3. The microprocessor according to claim 1, wherein said load module stored in said first memory unit includes data for image processing and the instruction codes for image processing.

4. A microprocessor to which a plurality of memory units including a first memory unit and a second memory unit and having physical addresses different from each other are externally connected, said microprocessor comprising:
a first address conversion unit which carries out a first address conversion by assigning a first physical address of said first memory unit to a first logical address of a load module stored in said first memory unit, wherein said load module includes an instruction code and numerical data;
a processing unit which temporarily stores and copies said instruction code from said load module stored in said first memory unit to said second memory unit; and
a second address conversion unit which carries out a second address conversion different from the first address conversion by assigning a second physical address of said second memory unit to a second logical address of the instruction code copied to said second memory unit, wherein
said first address conversion unit comprises a first comparator that compares a requested logical address with said first logical address, and
said second address conversion unit comprises a second comparator that compares said requested logical address with said second logical address.

5. The microprocessor according to claim 4, wherein when said load module stored in said second memory unit is accessed, said first address conversion unit assigns the physical address of said first memory unit to the logical address of said load module to be accessed, and said second address conversion unit assigns the physical address of said second memory unit to said logical address of the instruction code from said load module to be accessed.

6. The microprocessor according to claim 4, wherein said load module stored in said first memory unit includes data for image processing and the instruction codes for image processing.

7. A device comprising:
a plurality of memory units including a first memory unit and a second memory unit and having physical addresses different from each other;

a first address conversion unit which carries out a first address conversion by assigning a first physical address of said first memory unit to a first logical address of a load module stored in said first memory unit, wherein said load module includes an instruction code and numerical data;

a copying unit which copies said instruction code from said load module stored in said first memory unit to said second memory unit; and a second address conversion unit which carries out a second address conversion different from the first address conversion by assigning a second physical address of said second memory unit to a second logical address of the instruction code copied to said second memory unit, wherein said first address conversion unit comprises a first comparator that compares a requested logical address with said first logical address, and said second address conversion unit comprises a second comparator that compares said requested logical address with said second logical address.

8. The device according to claim 7, wherein when said load module stored in said second memory unit is accessed, said first address conversion unit assigns the physical address of said first memory unit to the logical address of said load module to be accessed, and said second address conversion unit assigns the physical address of said second memory unit to said logical address of the instruction code from said load module to be accessed.

9. The device according to claim 7, wherein said load module stored in said first memory unit includes data for image processing and the instruction codes for image processing.

10. The device according to claim 7, wherein the access speed of said second memory unit is faster than the access speed of said first memory unit.

11. The device according to claim 10, wherein said second memory unit comprises a synchronous DRAM.

12. A device comprising:

a plurality of memory units including a first memory unit and a second memory unit and having physical addresses different from each other;

a first address conversion unit which carries out a first address conversion by assigning a first physical address of said first memory unit to a first logical address of a load module stored in said first memory unit, wherein said load module includes an instruction code and numerical data;

a processing unit which temporarily stores and copies said instruction code from said load module stored in said first memory unit to said second memory unit; and a second address conversion unit which carries out a second address conversion different from the first address conversion by assigning a second physical address of said second memory unit to a second logical address of the instruction code copied to said second memory unit, wherein said first address conversion unit comprises a first comparator that compares a requested logical address with said first logical address, and said second address conversion unit comprises a second comparator that compares said requested logical address with said second logical address.

13. The device according to claim 12, wherein when said load module stored in said first memory unit is accessed, said first address conversion unit assigns the physical address of said first memory unit to the logical address of said load module to be accessed, and said second address conversion unit assigns the physical address of said second memory unit to said logical address of the instruction code from said load module to be accessed.

14. The device according to claim 12, wherein said load module stored in said first memory unit includes data for image processing and image processing instruction codes.

15. The device according to claim 12, wherein the access speed of said second memory unit is faster than the access speed of said first memory unit.

16. The device according to claim 15, wherein said second memory unit comprises a synchronous DRAM.

17. The microprocessor of claim 1, wherein the operating speed of the second memory unit is faster than the operating speed of the first memory unit.

18. The microprocessor according to claim 1, wherein the first address conversion unit carries out the first address conversion for information including the numerical data.

19. The microprocessor according to claim 1, wherein the second address conversion unit carries out the second address conversion for the instruction code.

20. The microprocessor according to claim 4, wherein the first address conversion unit carries out the first address conversion for information including the numerical data.

21. The microprocessor according to claim 4, wherein the second address conversion unit carries out the second address conversion for the instruction code.

22. The device according to claim 7, wherein the first address conversion unit carries out the first address conversion for information including the numerical data.

23. The device according to claim 7, wherein the second address conversion unit carries out the second address conversion for the instruction code.

24. The device according to claim 12, wherein the first address conversion unit carries out the first address conversion for information including the numerical data.

25. The device according to claim 12, wherein the second address conversion unit carries out the second address conversion for the instruction code.

26. A method of accessing a plurality of memory units, including a first memory unit and a second memory unit, the memory units having differing physical addresses, the method comprising:

a first address conversion step which carries out a first address conversion by comparing a requested logical address with a first logical address and assigning a first physical address of said first memory unit to a load module logical address for a load module stored in said first memory unit, wherein said load module includes an instruction code and numerical data;

a copying step which copies said instruction code from said load module stored in said first memory unit to said second memory unit; and a second address conversion step which carries out a second address conversion different from the first address conversion by comparing said requested logical address with a second logical address and assigning a second physical address of said second memory unit to an instruction code logical address for the instruction code copied to said second memory unit.

27. The method according to claim 26, wherein when said load module stored in said second memory unit is accessed, the first address conversion step assigns the physical address of said first memory unit to the load module logical address of said load module to be accessed, and the second address conversion step assigns the physical address of said second memory unit to said instruction code logical address of the instruction code from said load module to be accessed.

28. The method according to claim 26, wherein said load module stored in said first memory unit includes data for image processing and image processing instruction codes.

29. The method according to claim 26, wherein the first address conversion step carries out the first address conversion for information including the numerical data.

30. The method according to claim 26, wherein the second address conversion step carries out the second address conversion for the instruction code.

31. A method of accessing a plurality of memory units, the memory units including a first memory unit and a second memory unit, wherein the memory units have differing physical addresses, the method comprising:

a first address conversion step which carries out a first address conversion by comparing a requested logical address with a first logical address and assigning a first physical address of said first memory unit to a load module logical address of a load module stored in said first memory unit, wherein said load module includes an instruction code and numerical data;

a processing step which temporarily stores and copies said instruction code from said load module stored in said first memory unit to said second memory unit; and a second address conversion step which carries out a second address conversion different from the first address conversion by comparing said requested logical address with a second logical address and assigning a second physical address of said second memory unit to an instruction code logical address of the instruction code copied to said second memory unit.

32. The method according to claim 31, wherein when said load module stored in said second memory unit is accessed, the first address conversion step assigns the physical address of said first memory unit to the load module logical address of said load module to be accessed, and the second address conversion step assigns the physical address of said second memory unit to said instruction code logical address of the instruction code from said load module to be accessed.

33. The method according to claim 31, wherein said load module stored in said first memory unit includes data for image processing and image processing instruction codes.

34. The method according to claim 31, wherein the first address the first address conversion for information including the numerical data.

35. The method according to claim 31, wherein the second address conversion step carries out the second address conversion for the instruction code.

* * * * *